July 18, 1939.  J. M. RODRIGUEZ  2,166,878

PHOTOGRAPHIC ENLARGING EASEL

Filed Jan. 26, 1938  2 Sheets—Sheet 1

JOAQUIN M. RODRIGUEZ
INVENTOR

BY Victor J. Evans & Co.
ATTORNEYS

July 18, 1939.  J. M. RODRIGUEZ  2,166,878
PHOTOGRAPHIC ENLARGING EASEL
Filed Jan. 26, 1938   2 Sheets-Sheet 2

JOAQUIN M. RODRIGUEZ
INVENTOR

BY *Victor J. Evans & Co.*
ATTORNEYS

Patented July 18, 1939

2,166,878

UNITED STATES PATENT OFFICE 2,166,878

PHOTOGRAPHIC ENLARGING EASEL

Joaquin M. Rodriguez, Yonkers, N. Y.

Application January 26, 1938, Serial No. 187,059

4 Claims. (Cl. 88—24)

This invention relates to improvements in photographic easels and more particularly to a new and improved form of photographic enlarging easel wherein means are provided for forming the enlargement at least near the center of the easel instead of near the corner thereof, as has been necessary with enlarging easels of the types heretofore known.

At least most of the types of enlarging easels heretofore known consist of a base plate having a hinged rectangular cutaway frame mounted on the back thereof and provided with a pair of blades slidably carried on abutting sides of said frame whereby said blades with one of the corners of said frame can define an essentially rectangular aperture of variable area. In enlarging work the photographic paper upon which the enlargement is to be made is positioned with one corner of the paper in a back corner of the frame abutting against stops positioned thereon and the sliding arms carried on the hinged rectangular frame are adjusted so that the area included between the arms and the corner of the frame corresponds to the desired picture area in the enlargement. Margins of the enlargement are formed by positioning relatively opaque masks over the photographic enlarging paper. These masks can comprise rectangular openings of the desired size cut in a sheet of opaque material, or can comprise L-shaped masks of various widths which in use are positioned with the apex of the L in the back corner of the frame, it being understood of course that the masking arms defining the other edges of the rectangular opening are adjusted to compensate for the difference in exposed area of the photographic paper before and after positioning the L-shaped mask thereon.

Notable among the major disadvantages of enlarging easels of the type hereinabove described are, first, that in making small enlargements it is difficult to properly position the paper without re-focusing the enlarger and, second, that the marginal area of the enlargement is of necessity limited to the width of the masking shields or of the arms. As regards the first of these disadvantages, it is to be observed that in the use of photographic enlarging shields of this type the paper is positioned with one corner of the paper in a back corner of the base plate. This is usually accomplished by raising the frame itself, that is by turning it upon its hinges, whereby the user can freely manipulate the paper to position it in the corner of the plate. Usually in making small enlargements the lens of the enlarging apparatus is positioned closely adjacent the paper upon which the enlargement is to be made. Accordingly, it will be seen that in order to raise the frame it would be necessary to rack up the enlarging lens or otherwise move it from position, thereby necessitating refocusing or at least readjustment of the apparatus after the paper has been positioned therein and prior to the making of the enlargement. The second disadvantage above mentioned is however of especial importance in the preparation of embossed edge photographs, although it is also an important consideration in routine enlarging work as well. It will be noted that inasmuch as the corner of the enlarging paper is positioned in a back corner of the enlarging frame, the margin of the enlargement is of necessity determined by marginal stops positioned in the corner superposed upon the sensitized paper. Unless special stops or masks are employed however, the marginal edges at this corner of the paper rarely exceed approximately 2 inches in width, which for certain purposes is insufficient. To obtain wider marginal edges it has been the custom in photographic work to prepare a special mask comprising a rectangular cutaway area formed in a sheet of paper material adapted to be superposed on the photographic paper during enlargement. This however is a relatively clumsy makeshift and consumes considerable time of the operator.

A further and concomitant disadvantage attendant upon the use of photographic enlarging easels of the type above described and due at least in major part to the manner in which the paper is positioned in the easel, is that without the use of special masking means the enlargement is not ordinarily made in the center of the easel and, accordingly, re-centering of the easel with respect to the optical axis of the projector is necessary before the making of a different size enlargement. For example, it will be obvious that, assuming a 3 x 5 enlargement is being made, the optical axis of the enlarging apparatus should intersect the paper at a place approximately 1½ inches from the 5 inch edge and approximately 2½ inches from the 3 inch edge, or, as it would work out in practice, at a distance which might conveniently be designated as X+2½ from one side of the enlarging frame and a distance designated for purposes of illustration as Y+1½ from the back edge of the frame, it being understood of course that the measurements are taken abutting the sides of the frame adjacent the corner wherein the corner of the photographic paper is positioned. Using the same equipment thereafter in the making of a 9 x 12 enlargement, it will be seen that the distance X+2½ will now become X+6 and the distance Y+1½ will become Y+4½, that is to say, the base plate of the enlarging easel will have to be moved obliquely to alter the position of intersection of the plate with the optical axis of the instrument. This, like the masking operation hereinabove referred to, consumes considerable of the operator's time.

It is among the more important objects of the present invention to provide a new and improved enlarging easel characterized in that the hereinabove mentioned disadvantages of enlarging easels of the types heretofore known are avoided and/or overcome.

More especially it is a major object of the present invention to provide an enlarging easel wherein the place of intersection of the optical axis of the instrument and the base plate of the easel is constant and unchanging even though enlargements of different sizes are made, that is to say, it is an object of the invention to provide an easel wherein the optical axis of the instrument intersects the base plate of the enlarging easel at a place at least near the center thereof.

It is also an important object of the present invention to provide a new and improved enlarging easel wherein means are included for permitting the preparation of relatively small enlargements without necessitating re-focusing or similar readjustment of the instrument during the positioning of the paper in the easel.

Noteworthy among the features of the improved enlarging easel according to the present invention are simplicity of construction, reflected in economies of manufacture, and also low cost of upkeep and repair. Moreover, in the preferred embodiment of the invention means are provided for angular movement of masking arms relative to the frame, whereby enlargements of irregular shapes such as, for example, parallelograms, trapeziums and the like can be prepared.

Other objects, advantages and features of the present invention will be apparent to those skilled in the art during the course of the following description taken in conjunction with the accompanying drawings.

Regarded in certain of its broader aspects the present invention comprises a photographic enlarging easel having a base plate comprising a plurality of interfitting relatively mobile sections carrying adjustable stops, whereby the back edge of the enlarging paper can be positioned abutting the stops at a place removed from the back corner heretofore used, and a frame associated with said plate carrying two sets of intersecting masking arms whereby a rectangular area can be defined within and limited by edge parts of said arms.

In order to facilitate a clearer and fuller understanding of the matter of the present invention, the herein illustrated and now preferred embodiment thereof will be hereinafter described, it being expressly understood however, that the specific embodiment of the invention herein illustrated is given solely by way of example and is non-limitative.

Referring then to the drawings—

Figure 1:
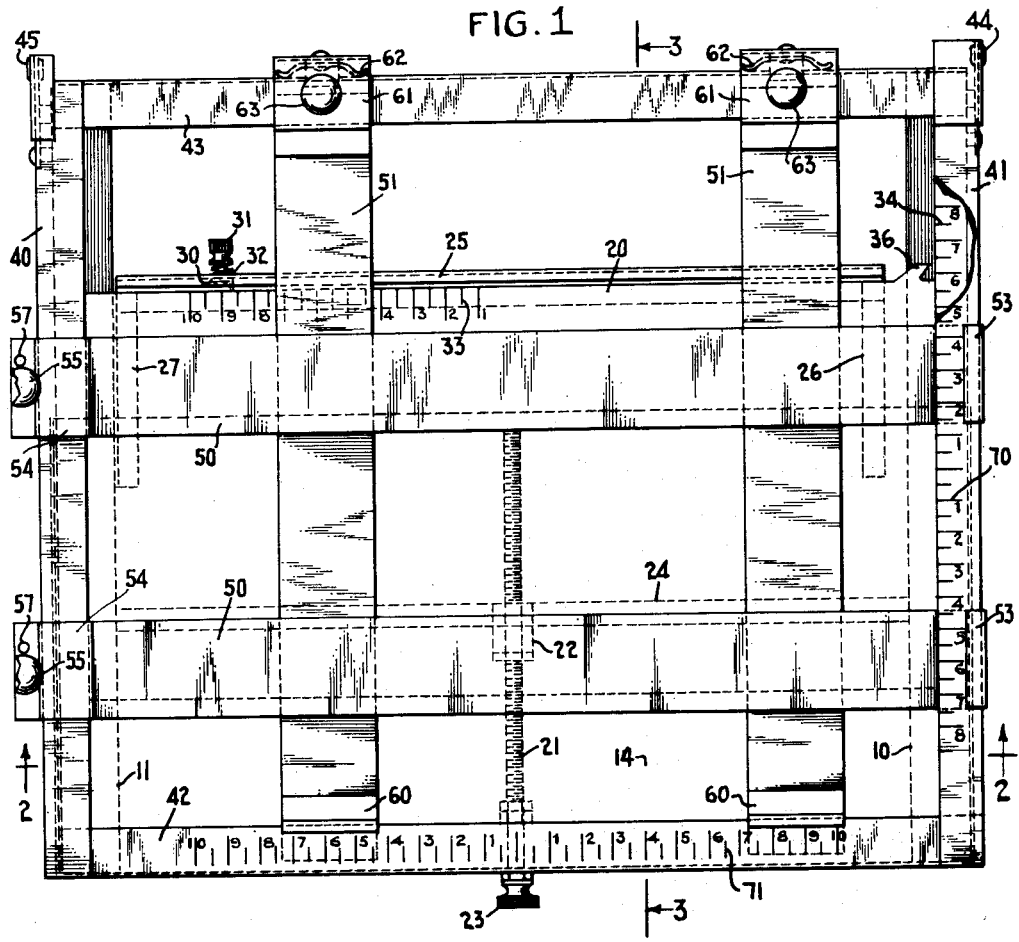
Fig. 1 is substantially a top plan view of the now preferred embodiment of the present invention, a portion of one side of the frame being broken away to expose interior parts.

Referring now to the drawings, the illustrated and now preferred embodiment of the present invention comprises a base plate having hingedly attached thereto a substantially rectangular cutaway frame. The base plate proper comprises a pair of sliding cooperating plates adapted to hold enlarging paper and the frame comprises a plurality of slidable intersecting pairs of masking arms. In order to facilitate the description of the present invention the base plate will first be described and thereafter the cooperating frame and associated elements.

Figure 2:
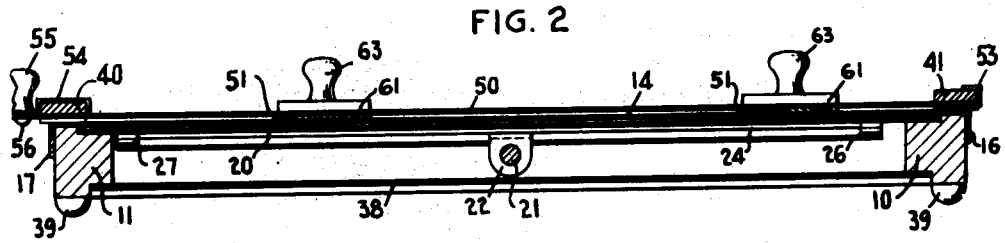
Fig. 2 is essentially a sectional view of Fig. 1 taken along the line 2—2.

The base plate proper comprises a U-shaped member consisting of arms 10 and 11 and a cross piece 12 connecting said arms. A top plate 14 is substantially fixedly attached to the arms of said U-shape and to the cross piece thereof, being bent downwardly across the front of the latter to provide the face portion 15 and being bent downwardly over the sides of the former, substantially as shown and designated by the numerals 16 and 17, said downwardly bent portions being attached to said U-shaped member whereby each in a measure serves to reinforce and support the other, producing a relatively strong composite structure. It is to be noted that the plate 14 extends from the front of the plate to a place intermediate in distance from the back of said plate. Inner edge portions of the cross pieces 10 and 11 are grooved substantially as shown in Fig. 2 to provide sliding support for the plate 20. The plate 20 is laterally slidable along the cross pieces, its movement being controlled preferably by means of a rack and pinion or similar device as, for example, in the illustrated embodiment a rotatable screw 21 mounted in an opening formed in the member 12 and element 15 and threadedly engaged with an opening formed in an L-shaped member 22 carried on the plate 20, whereby rotative movement imparted to the knob 23 is translated into sliding movement of the plate 20 relative to the plate 14. It is to be noted that ancillary supporting means comprising a bar-like member 24 is provided in conjunction with the plate 20, said bar 24 being fixedly attached to said slidable plate and extending across same to a place near the side pieces 10 and 11. During the process of enlarging the paper is positioned upon plates 14 and 20 as will be hereinafter described.

Figure 3:
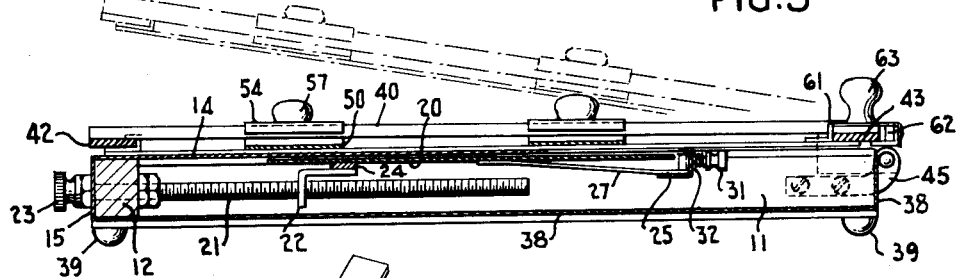
Fig. 3 is essentially a sectional view of Fig. 1 taken along the line 3—3.

In order to facilitate positioning the enlarging paper upon the plates 14 and 20 a stop 25 is carried on the latter, being attached thereto by resilient bar-like members 26 and 27 associated with the ends of said stop and attached to the end portion of said plate, whereby under certain conditions to be hereinafter referred to, the upper part of said stop can be positioned beneath or at least on a level with the plates 14 and/or 20, substantially as shown in Fig. 3. The stop comprises a U-shaped channel piece having an elongated slot-like opening 29 formed in the back thereof and extending along a portion of the length, said opening being adapted to receive a slidable L-shaped stop member 30 carried on a handle 31 received in said slot and being provided with a spring-pressed washer 32 frictionally engaging with the sides of said channel. In use, the enlarging paper is positioned with a corner abutting against the inner surface of the channel stop 25 at the place of intersection with the projecting face of the L-shaped stop 30. In order to facilitate adjustment of the stops 25 and 30 a graduated scale 33 is provided on the plate 20 and a graduated scale 34 is mounted upon the cross piece 10, the former scale being read directly from the projecting portion 35 of the stop 30 and the latter from a pointer or index 36 formed in the edge portion of the plate 20. It is to be noted that the index 36 corresponds to the inner back edge of the channel stop 25. The bottom portion of the base plate is closed by a plate 38 fixedly attached to the cross piece 12 and side arms 10 and 11 and bent upwardly at the back to provide an end element 38a, substantially as shown. Preferably a plurality of substantially hemispherical rubber feet 39 are provided on the bottom corners of the device to prevent marring of the surface upon which it rests.

Figure 4:
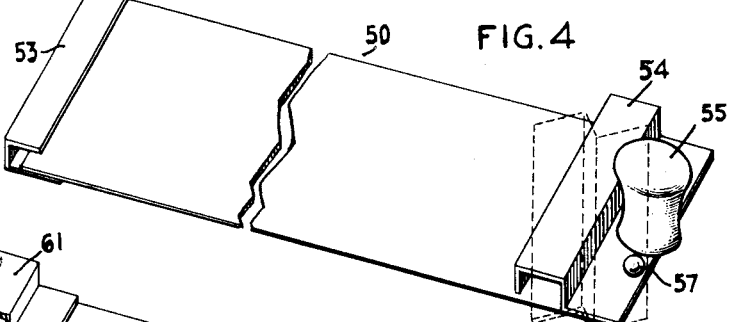
Figs. 4 and 5 are perspective views, the latter having parts broken away for clearness, illustrating types of masking arms adapted for use in conjunction with the device according to the present invention.

The frame portion of the new and improved enlarging easel according to the present invention will now be described and comprises a frame essentially rectangular in outline, consisting of a pair of side pieces 40 and 41 connected by a front cross piece 42 and a rear cross piece 43, the frame being attached to the rear portion of the base plate by hinge elements 44 and 45. It is to be noted that the frame comprising the members 41, 42 and 43 substantially conforms in outline to the outline of the base plate and is adapted to rest flush upon the surface thereof, substantially as shown in full line in Fig. 3, and is also adapted to be raised relative to said base plate as shown in phantom in Fig. 3. A plurality of masking arms 50 and 51 are provided, carried on and cooperating with portions of said frame and adapted to overlie parts of said base plate. The arms 50, one of which is illustrated in Fig. 4, each comprises a strip of resilient spring-like material such as, for example, spring steel formed with an end portion 53 adapted to slidably engage with portions of the side piece 41 and with other portions 54 adapted to be slidably mounted upon the side piece 40, substantially as shown. It is to be understood that the channel formed in the member 54 adapted to receive the side piece 40 is provided with inwardly bent edge portions whereby resilient qualities of said member facilitate holding the masking arm in position at various localities upon the side piece. Under certain conditions it is desirable to position the masking arm at an angle relative to the side piece 40. This is accomplished by loosening a threaded knob 55 attached to a threaded member 56 which passes through a slot-like opening formed in the material comprising the arm. Pivotal connecting means 57 associate said member 54 with said arm whereby the arm can be rotated about the pivot 54 and fixed in position by tightening the knob 55 upon the threaded member 56. It will be seen then that the member 54 can be moved relative to the arm from a position substantially as shown in full line in Fig. 4 to another position as, for instance, that shown in phantom in Fig. 4. It will, of course, be understood that sufficient play is provided to permit rotative movement of the arm as aforesaid while the pieces 53 and 54 are engaged with the respective side pieces 41 and 40. The side arms 50 define the top and bottom edges of the enlargement.

Figure 5:
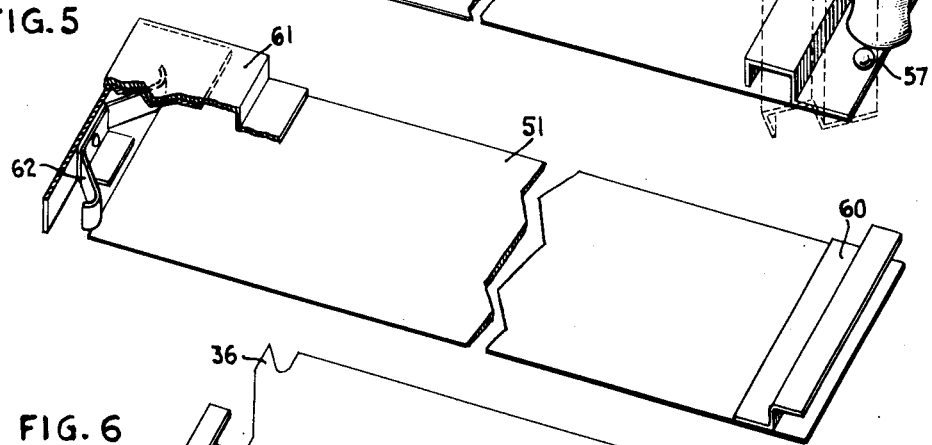
Figure 6:
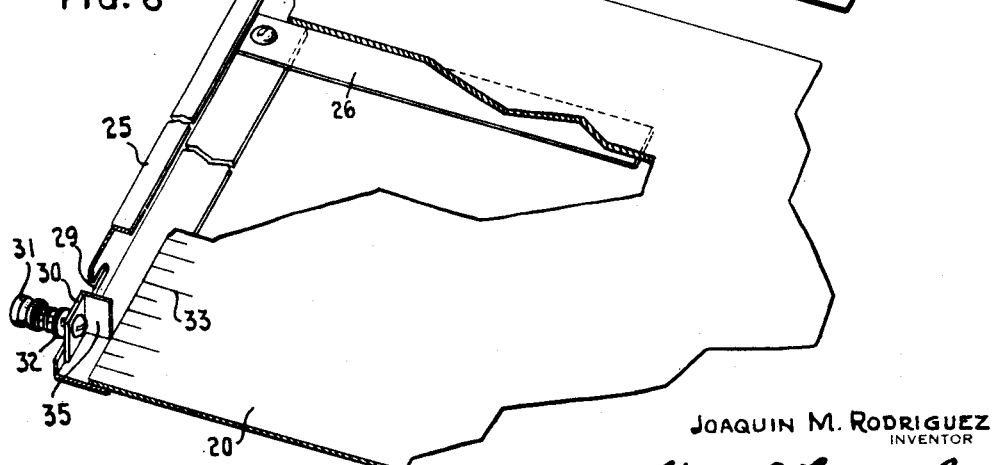
Fig. 6 is a fragmentary perspective view, parts being broken away for clearness, illustrating features of the sliding base plate in the device according to the present invention.

Although, of course, masking arms of the type hereinabove described could be utilized in place of the arms 51 illustrated, a modified form is shown as an alternative for use in conjunction with and forming part of the present invention. Referring now to Fig. 5, wherein one of the arms 51 is illustrated, it will be noted that the arm includes a bent end portion 60 defining in conjunction with the end of said arm, a channel adapted to slidably receive an edge portion of the cross piece 42 and provided at the opposite end with a channeled member 61 fixedly attached thereto and adapted to receive and slidably engage with the cross piece 43. A V-shaped resilient member 62 fixedly mounted on an inner portion of said member 61 is provided, adapted to abut against said cross piece 43 whereby the arm when once positioned will be firmly but slidably held in place. A knob 63 is provided on each of said arms to facilitate sliding movement thereof. The arms 51 define the side portions of the enlargement.

In use, the enlarging paper is placed upon the plates 14 and 20, as hereinbefore described, with the index 36 set at the predetermined and preselected position upon the scale 34. The index and stop 35 is also set to the desired position upon the scale 33 whereby the corner of the paper 30 is positioned as experience indicates is expeditious. The frame comprising the members 40, 41, 42 and 43 is then lowered in position upon the plate and the arms 50 and 51 adjusted to mask the paper as desired. Adjustment of the arms 50 and 51 is facilitated by reference to scales 70 and 71, respectively, mounted upon the elements 41 and 42 of the hinged frame. In the preferred embodiment of the invention these scales have as place of origin the midpoint of the respective sides whereby similar indicia set at similar indicators upon corresponding arms position the arms equidistantly from the place of intersection of the base plate and the optical axis of the instrument. Thus it will be seen that variation in size of enlargement being made does not require movement of the enlarging easel upon its support, but instead merely necessitates the readjustment of the masking arms 50 and 51. Moreover, in the making of very small enlargements it is to be observed that the plate 20 is moved whereby the back corner stops, comprising the channel stop 25 and the L-shaped stop 30, are positioned relatively near the front of the easel thereby permitting the operator to quickly and facilely position the paper within the easel by raising the frame relatively slightly.

It will, of course, be apparent to those skilled in the art that various modifications, changes and substitution of alternatives can be practised upon the hereinabove described and now preferred embodiment of the present invention without departure from the spirit of the invention or the scope thereof as recited in the appended claims; for example, other forms of masking arms could be employed instead of those hereinabove described; other means could be employed than the hereinabove described screw for imparting sliding movement to the plate 20, as well as other changes which will be obvious to those familiar with devices of this type.

What is claimed is:

1. A photographic enlarging easel of the type described, including a composite base plate comprising a relatively stationary supported first plate; a second plate, slidable relative to said first plate, disposed in a plane common thereto; manually operable means mounted in a portion of said composite base plate for causing sliding movement of said second plate relative to said first plate, said means including a rotatable shaft mounted in parts of said base, engaging with formations on said second plate whereby rotation of said shaft is translated into sliding motion of said second plate; stops carried on said second plate adapted to facilitate centering of enlarging paper positioned on said plates relative to said composite base plate; and a frame, pivotally mounted on an edge portion of said composite base plate, including a plurality of intersecting pairs of slidable essentially parallel masking arms arranged to overlie enlarging paper positioned on said composite plate.

2. A photographic enlarging easel of the type described, including a composite base plate comprising a relatively stationary supported first plate, a second plate slidable relative to said first plate and disposed in a plane common thereto, manually operable means mounted in a portion of said composite base plate for causing sliding movement of said second plate relative to said first plate, said means comprising a block mounted on said second plate having a threaded opening formed therein and a threaded member rotatably mounted in a portion of said composite base plate engaging with said threaded opening whereby rotative movement imparted to said threaded member is translated into sliding movement of said second plate relative to said first plate, stops carried on said second plate adapted to facilitate centering of enlarging paper positioned on said plates relative to said composite base plate, and a frame pivotally mounted on an edge portion of said composite base plate, said frame including a plurality of intersecting pairs of slidable essentially parallel masking arms arranged to overlie enlarging paper positioned on said composite plate.

3. A photographic enlarging easel of the type described, including a composite base plate comprising a relatively stationary supported first plate, a second plate slidable relative to said first plate and disposed in a plane common thereto, manually operable means mounted in a portion of said composite base plate for causing sliding movement of said second plate relative to said first plate, said means comprising a rack mounted upon and carried by said second plate and positioned substantially parallel to the direction of sliding movement thereof, a shaft mounted in portions of said composite base plate, a gear carried on said shaft engaging with said rack, means for imparting rotative movement to said shaft whereby sliding movement can be imparted to said plate, stops carried on said second plate adapted to facilitate centering of enlarging paper positioned on said plates relative to said composite base plate, and a frame pivotally mounted on an edge portion of said composite base plate, said frame including a plurality of intersecting pairs of slidable essentially parallel masking arms arranged to overlie enlarging paper positioned on said composite plate.

4. A photographic enlarging easel of the type described, including a composite base plate, said base plate comprising a horizontally positioned, U-shaped supporting member consisting of arms and cross piece disposed in a common plane, a relatively stationary first plate mounted upon said U-shaped member, a second plate slidable in grooves formed in said arms of said member and relative to said stationary plate, said first and said second plates being disposed in substantially a common plane, manually operable means mounted in said member for imparting sliding movement to said second plate relative to said first plate, retractable adjustable stops carried on said second plate adapted to facilitate centering of enlarging paper positioned on said first and second plates relative to said base plate, a graduated scale mounted on said sliding plate for facilitating adjustment of said stops, a graduated scale mounted on said member and an index carried on said slidable second plate cooperating with said scale adapted to indicate relative positions of said second plate, and an essentially rectangular frame pivotally mounted upon an edge portion of said composite plate, said frame including a plurality of intersecting pairs of essentially parallel masking arms adapted to overlie paper positioned upon said base plate, said arms being slidably mounted upon portions of said frame and adapted to define a rectangular opening, and graduated scales mounted upon portions of said frame adapted to indicate relative positions of said masking arms.

JOAQUIN M. RODRIGUEZ.